United States Patent
Zilberberg

(10) Patent No.: US 8,866,459 B2
(45) Date of Patent: Oct. 21, 2014

(54) APPARATUS, METHOD AND SYSTEM FOR CONTROL OF AC/AC CONVERSION

(71) Applicant: Power Offer Electronics Ltd., Bnei Brak (IL)

(72) Inventor: Ofer Zilberberg, Tel Aviv (IL)

(73) Assignee: Power Offer Electronics Ltd., Bnei Brak (IL)

(*) Notice: Subject to any disclaimer, the term of this patent is extended or adjusted under 35 U.S.C. 154(b) by 0 days.

(21) Appl. No.: 14/016,335

(22) Filed: Sep. 3, 2013

(65) Prior Publication Data

US 2014/0002039 A1    Jan. 2, 2014

Related U.S. Application Data

(62) Division of application No. 12/097,200, filed as application No. PCT/IL2006/001420 on Dec. 11, 2006, now Pat. No. 8,354,829.

(60) Provisional application No. 60/749,045, filed on Dec. 5, 2005.

(51) Int. Cl.

| | | |
|---|---|---|
| G05F 1/00 | (2006.01) | |
| H05B 41/392 | (2006.01) | |
| G05F 5/00 | (2006.01) | |
| H02P 27/00 | (2006.01) | |
| H05B 39/04 | (2006.01) | |
| H02M 5/293 | (2006.01) | |

(52) U.S. Cl.
CPC ............. *G05F 5/00* (2013.01); *H05B 41/3924* (2013.01); *H02P 27/00* (2013.01); *H05B 39/048* (2013.01); *H02M 5/293* (2013.01); *H02M 2005/2932* (2013.01)

USPC .......................................... 323/282; 323/283

(58) Field of Classification Search
USPC .......... 323/222, 223, 271, 282, 283, 284, 285
See application file for complete search history.

(56) References Cited

U.S. PATENT DOCUMENTS

| | | |
|---|---|---|
| 4,347,474 A | 8/1982 | Brooks et al. |
| 4,468,725 A | 8/1984 | Venturini |
| 4,642,751 A | 2/1987 | Schauder |
| 4,697,230 A | 9/1987 | Neft |
| 4,833,588 A | 5/1989 | Schauder |
| 5,602,725 A | 2/1997 | Venkataramanan |

(Continued)

FOREIGN PATENT DOCUMENTS

WO    WO 96/21894    7/1996

OTHER PUBLICATIONS

Bose, "Recent Advances in Power Electronics", IEEE Transactions on Power Electronics, vol. 7, No. 1, Jan. 1992, pp. 2-16.

(Continued)

*Primary Examiner* — Nguyen Tran
(74) *Attorney, Agent, or Firm* — Pearl Cohen Zedek Latzer Baratz LLP

(57) ABSTRACT

A method, system and apparatus for controlling a pulse width modulator (PWM) converter for direct AC/AC conversion and/or AC voltage regulation. According to some embodiments of the invention, an output voltage may be provided, independent of the input voltage quality, thereby avoiding or minimizing power company irregularities, brownouts and the like. Embodiments of the present invention may be useful, for example, for use in connection with motors and motored devices or other applications.

5 Claims, 11 Drawing Sheets

(56) References Cited

U.S. PATENT DOCUMENTS

| | | | |
|---|---|---|---|
| 5,635,826 | A | 6/1997 | Sugawara |
| 5,747,972 | A | 5/1998 | Baretich et al. |
| 5,949,672 | A | 9/1999 | Bernet |
| 6,396,251 | B2 * | 5/2002 | Corva et al. ............ 323/283 |
| 2004/0119448 | A1 | 6/2004 | Wiegand et al. |
| 2004/0208022 | A1 * | 10/2004 | Gibson ............ 363/16 |
| 2005/0128772 | A1 | 6/2005 | Choi et al. |
| 2005/0219875 | A1 | 10/2005 | Millner et al. |
| 2006/0055381 | A1 | 3/2006 | Rice |
| 2006/0092676 | A1 | 5/2006 | Liptak et al. |

OTHER PUBLICATIONS

International Search Report for International Application No. PCT/IL06/01420 mailed Dec. 11, 2007.

Office Action issued by the United States Patent and Trademark Office for U.S. Appl. No. 12/097,200 dated Apr. 25, 2012.

Office Action issued by the United States Patent and Trademark Office for U.S. Appl. No. 12/097,200 dated Jul. 27, 2012.

Notice of Allowance issued by the United States Patent and Trademark Office for U.S. Appl. No. 12/097,200 dated Oct. 29, 2012.

Ma Huasheng et al: "Dynamic characteristics analysis and instantaneous value control design for buck-type power electronic transformer (PET)", Industrial Electronics Society, 2005, IECON 2005. 31st Annual Conference of IEEE, IEEE, Piscataway, NJ, USA, Nov. 6, 2005, pp. 1043-1047, XP010876079, ISBN:9787-0-7803-9252-6.

Enjeti P N et al: "An approach to realize higher power PWM AC controller", Proceedings of the Annual Applied Power Electronics Conference and Exposition (APEC), San Diego, Mar. 7-11, 1993; (Proceedings of the Annual Applied Power Electronics Conference and Exposition (APEC), New York, IEEE, US, vol. CONF. 8, Mar. 7, 1993, pp. 323-327, XP010111206, DOI: 10.1109/APEC.1993.290613, ISBN: 978-0-7803-0983-8.

European Search Report of Application No. 06832227.0 mailed on May 8, 2013.

Notice of Allowance issued by the United States Patent and Trademark Office for U.S. Appl. No. 13/737,141 dated May 17, 2013.

* cited by examiner

APPARATUS, METHOD AND SYSTEM FOR CONTROL OF AC/AC CONVERSION

CROSS REFERENCE TO RELATED APPLICATIONS

This application is a divisional application of U.S. patent application Ser. No. 12/097,200, filed Oct. 14, 2008, which is a National Phase Application of PCT International Application No. PCT/IL2006/001420, International Filing Date Dec. 11, 2006, claiming priority of U.S. Provisional Patent Application No. 60/749,045, filed Dec. 12, 2005, all of which are incorporated herein by reference in their entirety.

FIELD OF THE INVENTION

The field of this invention is generally power conversion, and more specifically, power conversion and/or voltage regulation for AC/AC applications.

BACKGROUND OF THE INVENTION

In some alternating current (AC) electrical systems it may be beneficial to provide for stabilization of the output voltage. Known devices and methods for stabilizing AC output voltage may typically require conversion to direct current (DC) and then back to AC, which may result in inefficiency and high production costs. Other devices may use variacs, electromechanical devices, and/or components with ferro-resonance characteristics. Yet other systems may use or include an uninterruptible power supply (UPS), however, the UPS may be too large and/or expensive for many applications that may benefit from stabilized or regulated AC output voltage. Accordingly, there is a need for an efficient and inexpensive method and device for AC voltage stabilization.

FIG. 1 illustrates a step-down synchronous buck converter arrangement 100, also referred to as an electronic transformer or line conditioner. In operation, AC source 101 may provide an input voltage signal. The voltage at reference node 102, which may be a signal voltage-divided from the input voltage signal, may be fed to pulse width modulator (PWM) module 108. The operation may use a synchronous PWM controller 108 to provide the control signals for switches 103 and 104, via signals at outputs Qa and Qb, where Qa and Qb are substantially complimentary. Switches 103 and 104 may be controlled by the PWM or synchronous converter 108 to chop the input voltage. Inductor 105 and capacitor 106 comprise a basic output filter that may filter the voltage and provide the load 107 with stable AC voltage. Accordingly, based on the pulse width modulation, which drives the switching scheme, load 107 may be provided with an output voltage amplitude that is less than the input voltage.

FIGS. 2(*a*), 2(*b*), 2(*c*) and 2(*d*) illustrate examples of implementations of bidirectional switches that may be used in connection with an AC/AC converter, including using field effect transistors (FET) and bipolar junction transistors (BJT), as well as diodes.

In the example provided in FIG. 1, the output voltage amplitude at load 107 may be:

$$V_{out} = V_{in} \times DC, \quad (1)$$

where DC represents the duty cycle of signal Qa, e.g., the time Qa is conducting as a fraction of the total period of the signal.

In the configuration of FIG. 1, due to the output filter constructed using inductor 105 and capacitor 106, the output voltage will be delayed relative to the input voltage, and therefore, the output voltage may be out of phase with the input voltage signal, thereby producing harmonic distortion and/or phase distortion. Since the control loop of the circuit configuration may be referenced to the input voltage signal, the circuit will try to obtain an output voltage signal in phase with the input voltage signal, which, as described in further detail below, may cause distortion at or near the zero crossing of the input voltage, as seen at FIG. 3, below.

FIG. 3 is a graph 300 plotting input voltage 320 and output voltage 330 along time axis 310 for a circuit such as the one depicted in FIG. 2. Output voltage amplitude may be less than that of the input voltage amplitude by a factor equal to the duty cycle, e.g., 50% for a duty cycle of 50%. The output voltage may be delayed or out of phase with respect to the input voltage by $t=\tau$, where $\tau$ may be determined by the characteristics of the output filter, for example, the inductance and capacitance values of the output filter.

When using a PWM regulator for line conditioning applications, the output voltage may be phase-locked to the input voltage, for example, in order to achieve smooth transitions in the case of bypass conditioning and small phase margins between the three phase circuits. In some cases where output voltage must be in phase to input voltage, a closed-loop control is appropriate. Closing the control loop for zero delay output voltage with respect to input voltage, however, may result in the duty cycle demand as shown in FIG. 4.

FIG. 4 depicts a graph 400 of the duty cycle 420 varying along time axis 410 that would be required in order to provide for an output voltage having no phase delay with respect to input voltage, where Equation (1) is rewritten as DC=Vout/Vin. In the case of closed-loop control, a portion of the output voltage is sensed and compared to the input voltage to produce an error voltage for the control loop. As seen with respect to the graph of FIG. 4, the required duty cycle may approach positive infinity 430 just before the zero crossing of the input voltage and re-appear at negative infinity 440 just after the zero crossing of the input voltage signal. Such demands may produce clipping at the high and low boundaries of the feasible duty cycle, e.g., 100% and 0%. In addition, in real-world applications, it is difficult if not impractical for the control loop to handle an instantaneous change from positively infinite required duty cycle to a negatively infinite required duty cycle, or, for example, 100% duty cycle to 0% duty cycle. Accordingly, the output voltage may contain errors and total harmonic distortion (THD) may result.

SUMMARY OF THE INVENTION

In a converter for converting an input alternating current (AC) signal to an output AC signal using synchronous pulse width modulation, one embodiment of the invention may include an apparatus for providing switching signals to at least first and second converter switches, comprising a selectable crossover module adapted to receive first and second input signals produced by a pulse width modulator, and to provide signals at first and second outputs to the first and second converter switches, the crossover module having first and second modes, wherein in the first mode, the first output of the crossover module is connected to provide the first input signal, and the second output is connected to provide the second input signal, and in the second mode, the first output of the crossover module is connected to provide the second input signal, and the first output is connected to provide the second input signal. In some embodiments of the invention, the crossover module may be further to receive a control signal for selecting between the first state and the second state. In some embodiments, there may be means for providing the control signal to change modes of the crossover module with reference to a change in polarity of a control reference signal. In some embodiments the control reference signal may be the voltage of the input AC signal, the voltage of the output signal, or a combination thereof. Embodiments of the invention may further include a pulse width modulation controller to provide the first and second input signals, the first and second input signals having substantially complementary duty cycles determined by a level of an input reference signal. In some embodiments of the invention, the input reference signal may be derived by dividing an error signal by the input AC signal, wherein said error signal based on a difference between the input AC signal and the output AC signal.

In a converter for converting an input alternating current (AC) signal to an output AC signal using synchronous pulse width modulation, embodiments of the invention may further include an apparatus for providing switching signals to at least first, second, third and fourth converter switches, comprising a second selectable crossover module adapted to receive first and second input signals produced by a second pulse width modulator, and to provide signals at first and second outputs to the third and fourth converter switches, the second crossover module having first and second modes, wherein in the first mode, the first output of the second crossover module is connected to provide the first input signal, and the second output is connected to provide the second input signal, and in the second mode, the first output of the second crossover module is connected to provide the second input signal, and the first output is connected to provide the second input signal. Embodiments of the invention may further include a second pulse width modulation controller to provide to said second selectable crossover module the first and second input signals, the first and second input signals having first and second respective duty cycles determined by a level of an input reference signal, and being substantially complementary to each other. In one embodiment of the invention, one of the pulse width modulation controllers may be a buck controller, and the other pulse width modulation controller may be a boost controller.

In a converter for converting an input alternating current (AC) signal to an output AC signal using synchronous pulse width modulation, an embodiment of the present invention may include an apparatus for providing switching signals to at least first and second converter switches, comprising a selectable crossover module adapted to receive an input reference signal and provide an output signal to a pulse width modulation controller, the crossover module having first and second modes, wherein in the first mode, the output signal of the crossover module is connected to provide an output signal reference level proportional to said input reference level, and in the second mode, the first signal of the crossover module is connected to provide an output signal reference level inversely proportional to said input reference level. In some embodiments of the invention, the crossover module may further be to receive a control signal for selecting between the first state and the second state. Embodiments of the invention may further include means for providing said control signal to change modes of the crossover module with reference to a change in polarity of a control reference signal. In some embodiments of the invention, the control reference signal may be based on at least one signal selected from the voltage of the input AC signal and the voltage of the AC output signal, or a combination thereof. In some embodiments of the invention, the selectable crossover module may be a selectably inverting/non-inverting amplifier. In some embodiments of the invention, the input reference signal may be derived by dividing an error signal by the input AC signal, wherein the error signal based on a difference between the input AC signal and the output AC signal.

In a converter for converting an input alternating current (AC) signal to an output AC signal using synchronous pulse width modulation, the invention may include an apparatus for providing switching signals to at least first and second converter switches, comprising a selectable crossover module adapted to receive an input reference signal and a ramp signal, and to provide signals at first and second outputs to a pulse width modulator, the crossover module having first and second modes, wherein in the first mode, the first output of the crossover module is connected to provide the input reference signal, and the second output is connected to provide the ramp signal, and in the second mode, the first output of the crossover module is connected to provide the ramp signal, and the first output is connected to provide the input reference signal. In some embodiments of the invention, the crossover module may be further to receive a control signal for selecting between the first state and the second state. Embodiments of the invention may further include means for providing said control signal to change modes of the crossover module with reference to a change in polarity of a control reference signal. In some embodiments of the invention, the control reference signal may be based on at least one signal selected from the voltage of the input AC signal and the voltage of the AC output signal. Some embodiments of the invention may further include a pulse width modulation controller to provide first and second substantially complementary switching signals having duty cycle based on the first and second outputs of the crossover module. Some embodiments of the invention may further include a second selectable crossover module adapted to receive an input reference signal and a second ramp signal, and to provide signals at first and second outputs to a second pulse width modulator, the second crossover module having first and second modes, wherein in the first mode, the first output of the crossover module is connected to provide the input reference signal, and the second output is connected to provide the second ramp signal, and in the second mode, the first output of the crossover module is connected to provide the second ramp signal, and the first output is connected to provide the input reference signal. Some embodiments of the invention may further include a to second pulse width modulation controller to provide first and second substantially complementary switching signals having duty cycle based on the first and second outputs of the second crossover module. In some embodiments of the invention, one of the pulse width modulation controllers may be a buck controller, and the other of the pulse width modulation controllers may be a boost controller. In some embodiments of the invention, the input reference signal may be derived by dividing an error signal by the input AC signal, wherein the error signal based on a difference between the input AC signal and the output AC signal.

A method of converting an input alternating current (AC) signal to an output AC signal using synchronous pulse width modulation in accordance with embodiments of the present invention may include receiving an input alternating current signal, producing a reference signal based on the level of the input signal, producing a pulse-width modulated signal based on the level of said reference signal, and inverting the pulse width modulated signal timed with reference to a zero crossing of said input signal.

Embodiments of the present invention may include systems using apparatuses or methods described herein. Systems in accordance with the present invention may include the apparatus for regulating or controlling voltage an electrical appliance, wherein the apparatus is configured to receive an input voltage and provide a stabilized output voltage to the appliance. In some systems, the apparatus of the present invention may be used for correcting power factor of the output voltage. In some embodiments of the present invention, the apparatus of the present invention may be used for regulating a voltage for a light bulb or other lighting element. In some embodiments of the invention, a system may use the apparatus of the present invention as an AC/AC transformer having variable output to input voltage ratio, wherein in some embodiments, the variation in ratio may be manual, while in other embodiments, the variation may be controlled by a closed feedback loop or by an open feedback loop control.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
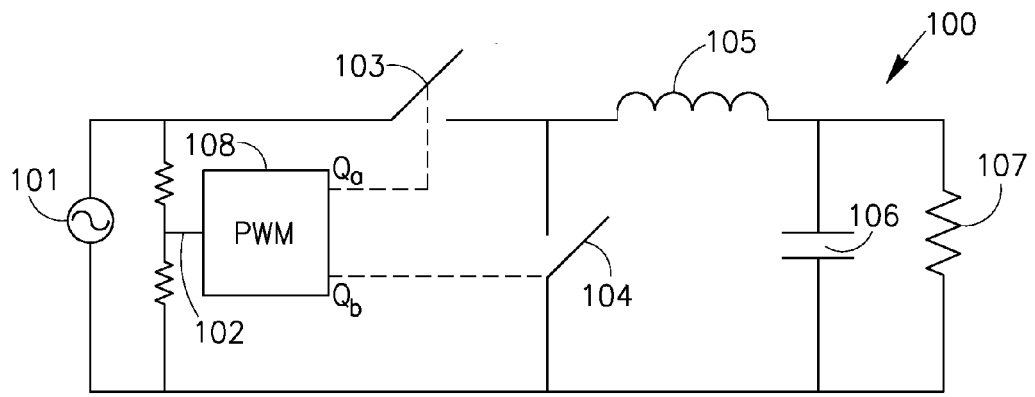
FIG. 1 is a schematic drawing of a buck converter.
Figure 2:
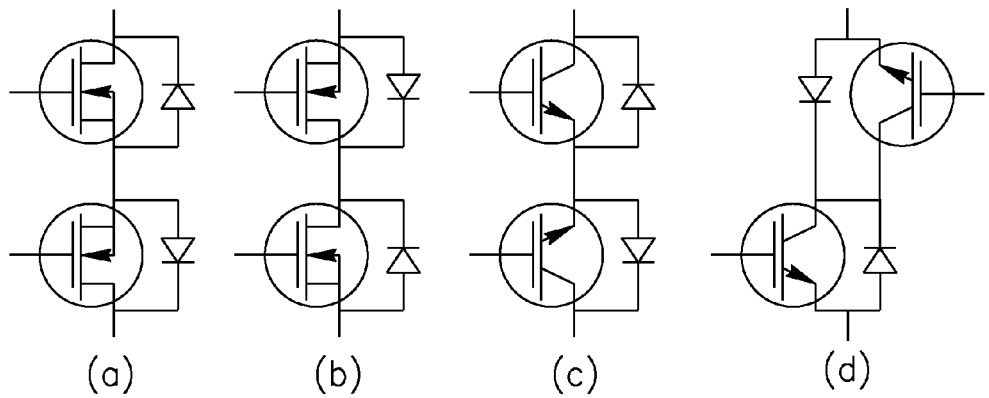
FIGS. 2(a), 2(b), 2(c) and 2(d) illustrate examples of implementations of bidirectional switches that may be used in connection with an AC converter.
Figure 3:
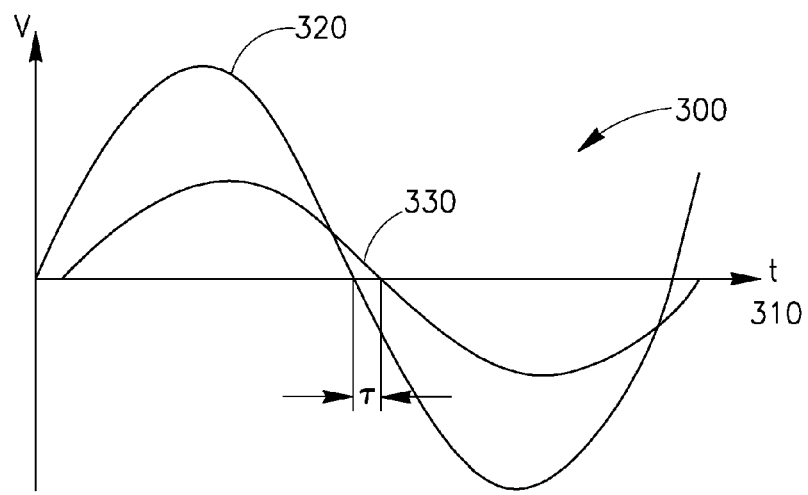
FIG. 3 is a graph showing output voltage and input voltage in the converter of FIG. 1.
Figure 4:
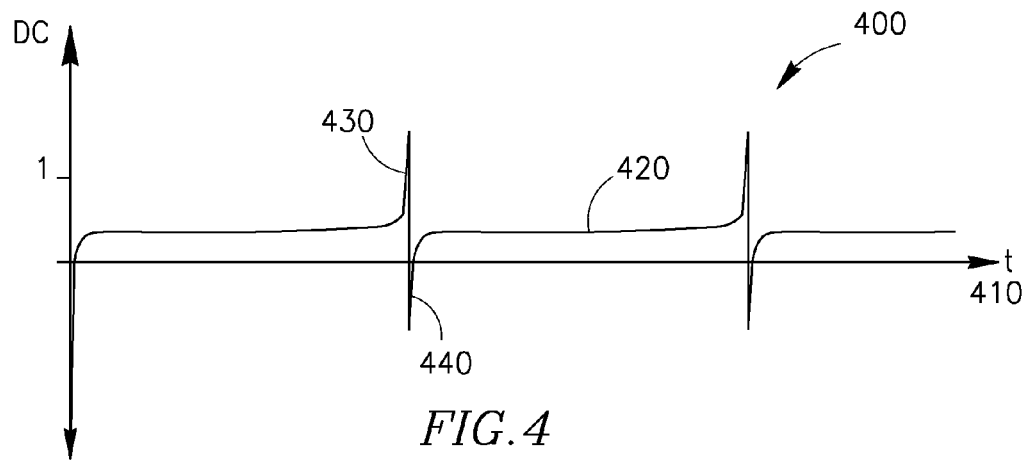
FIG. 4 is a graph showing the theoretical duty cycle of an AC/AC PWM loop control.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the invention may employ a method and device for controlling a pulse width modulator (PWM) converter for direct AC/AC conversion and/or AC voltage regulation. According to some embodiments of the invention, an output voltage may be provided, independent of the input voltage quality, thereby avoiding or minimizing power company irregularities, brownouts and the like. Embodiments of the present invention may be useful, for example, for use in connection with motors and motored devices or other applications.

Embodiments of the present invention may be used to avoid, overcome or otherwise reduce a singularity problem during the zero voltage crossing of the input voltage signal. Embodiments of the present invention for AC/AC conversion may be used, for example, in conjunction with any of the well-known topologies, including but not limited to buck, boost, buck-boost, Cuk, sepic, and matrix converters, or hybrids thereof. The control loop of embodiments of the invention may be used for example with isolated or non-isolated AC/AC converters, to eliminate or reduce the "near zero" error of output voltage for generating an output with reduced total harmonic distortion (THD). Embodiments of the invention may be used, for example, to improve efficiency, or to "clean" power problems caused by electrical motors and/or motor drives.

Figure 5:
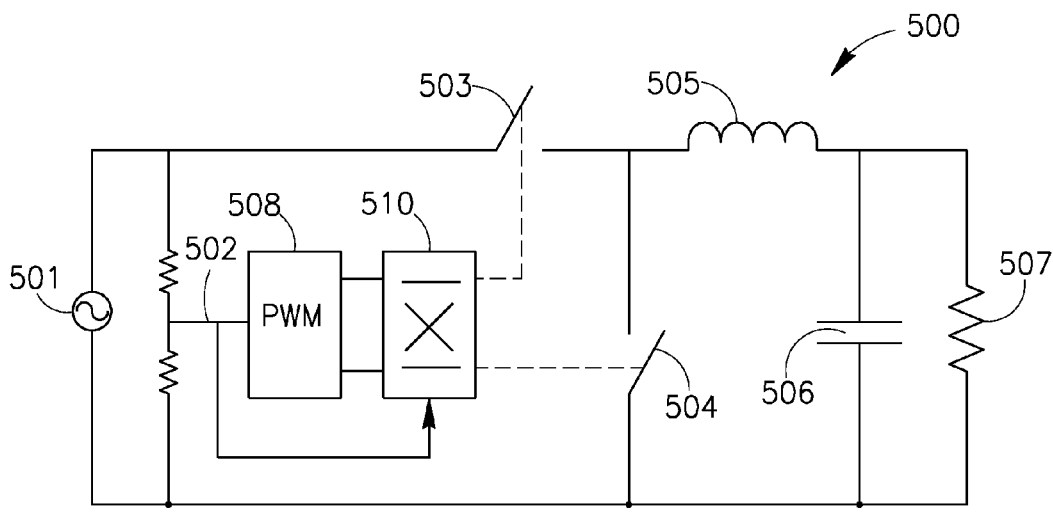
FIG. 5 is a schematic illustration of an AC/AC converter in accordance with embodiments of the present invention.

FIG. 5 illustrates a step-down synchronous buck converter arrangement 500 in accordance with an embodiment of the present invention. In operation, AC source 501 may provide an input voltage signal. An input reference voltage, which may be a signal scaled or voltage-divided from the input voltage signal produced by source 501, may be fed to pulse width modulator (PWM) module or controller 508 at node 502. In the embodiment depicted, PWM controller 508 may be a synchronous PWM controller to provide substantially complementary signals having duty cycles related to the level of the voltage at reference node 502. Thus, when a first output of PWM is on, the second output is off, and vice versa. Output signals of PWM controller 508 may substantially complementary, for example, there may be a blanking interval to ensure that the switches are never on simultaneously, thereby short circuiting the output stage. Although the blanking circuitry may not be shown, it will be recognized that such circuitry may be included for such purposes. Thus, for example, a first output of PWM 508 may have a small duty cycle, e.g., 30%, for a low input reference voltage, and the second output of PWM 508 may have a substantially complementarily large duty cycle, e.g., 70%.

In the embodiment shown, the outputs of PWM controller 508 may be connected to respective inputs of a crossover switch module 510. Crossover switch module may have at least two states, a normal and a crossed state. In a normal state, the first output may be substantially the same as the first input, and the second output may be substantially the same as the second output. In a crossed state, the first output may be substantially the same as the second input, and the second output may be substantially the same as the first input. First and second outputs of crossover switching module 510 may be connected to switches 503 and 504, respectively. A control signal to crossover switch 510 may be provided to change the state of the crossover switch between the normal and crossed states. An output filter may be provided, for example, inductor 505 and capacitor 506, and the load 507 may be delivered with a stable AC output voltage.

In embodiments of the invention, the control signal to the crossover switch may be timed to induce the change of state at or around the time when input voltage signal changes polarity. In some embodiments, the control signal may be provided by a polarity detector to detect a change in polarity of the input signal. In other embodiments, the control signal may depend on a change in polarity of the output voltage signal. In some embodiments, the control signal may trigger the crossover at a time related to both the change of polarity of the input signal and change of polarity of the output signal, for example at a time therebetween. In some embodiments, the control signal may depend on an output of a phase detector detecting a difference in phase between the input voltage and the output voltage.

In operation, the arrangement of FIG. 5, or other arrangements described in connection with embodiments of the invention, may avoid or reduce the zero crossing problem, for example, by switching the inputs at, near, or approximately the time of the zero crossing of the input signal.

Figure 6:
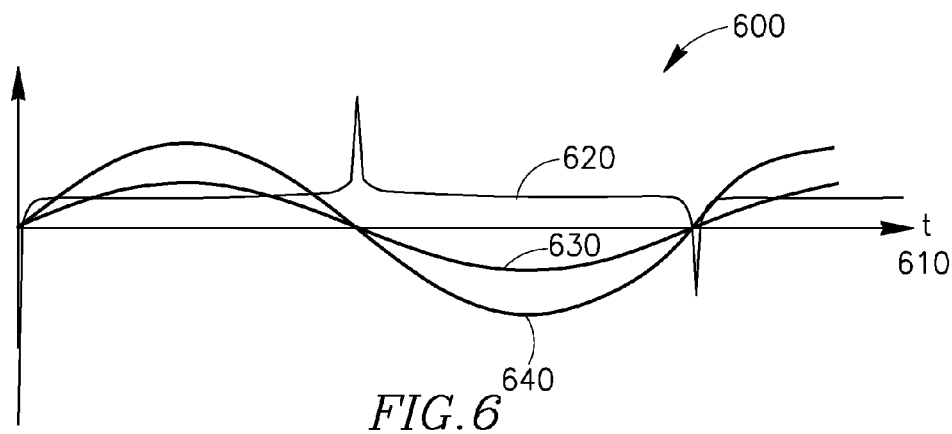
FIG. 6 is a graph showing duty cycle of an AC/AC PWM loop control in accordance with embodiments of the present invention.

FIG. 6 depicts a graph 600 of the duty cycle 620 varying along time axis 610 that may be used to provide for an output voltage 630 having no or little phase delay with respect to input voltage 640 in an arrangement such as one depicted in FIG. 5 in accordance with embodiments of the present invention. Based on the changing state of the crossover switch, the singularity at the zero input voltage crossing may be solved, e.g., by avoiding the requirement of the duty cycle to migrate from a large positive duty cycle to a large negative duty cycle at the zero input voltage crossing. According to embodiments of the invention, the duty cycle may increase to a large positive value before the zero input signal crossing, remain at a large positive value, and decrease from the large positive value after the zero crossing of the input signal. A similar analysis holds true with required changes at large negative values of they duty cycle.

Embodiments of the invention may use various suitable implementations of one or more crossover switches. In some embodiments, crossover switches may have low impedance, for example, by construction using field effect transistors (FETs). For example, some embodiments of the invention may use a discrete or integrated circuit such as ADG452 manufactured by Analog Devices. Crossover switch module may be implemented in a variety of ways, for example, using digital logic gates, digital or analog multiplexers, analog amplifiers, or other components.

Figure 7A:
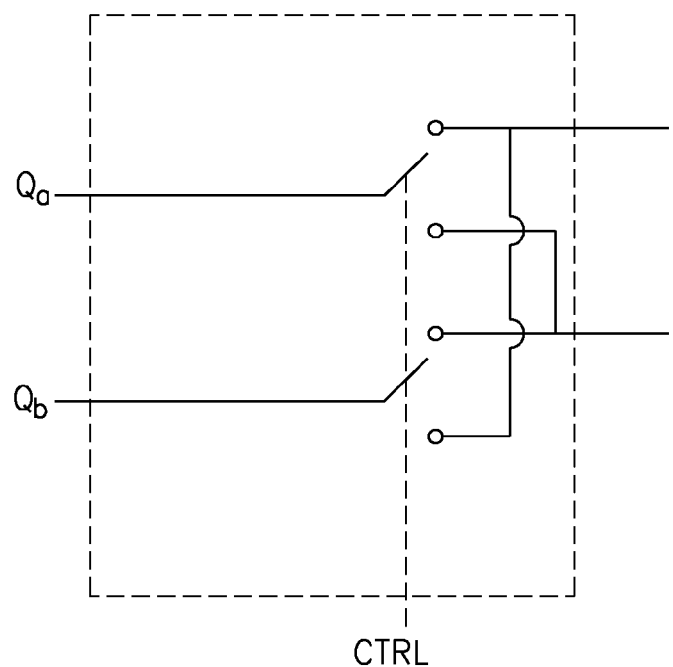
FIGS. 7A, 7B, 7C and 7D are schematic drawings of examples of implementations of crossover modules that may be used in accordance with embodiments of the present invention.
Figure 7B:
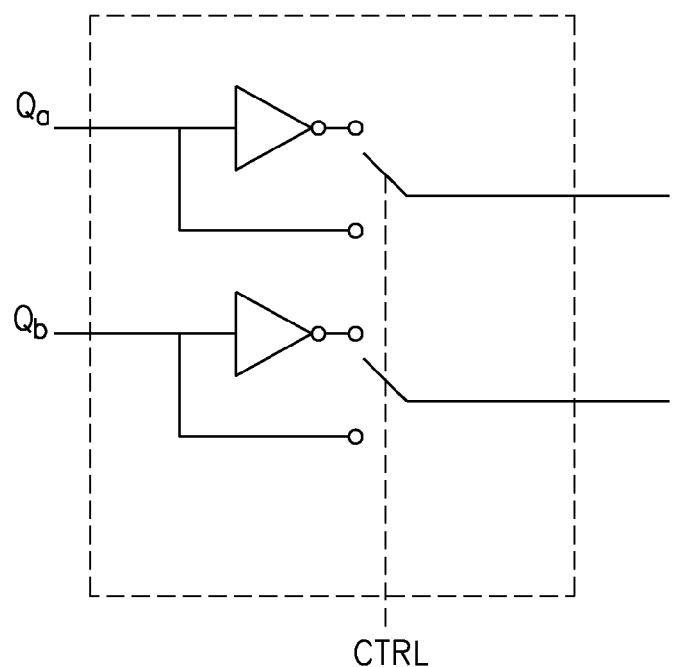
Figure 7C:
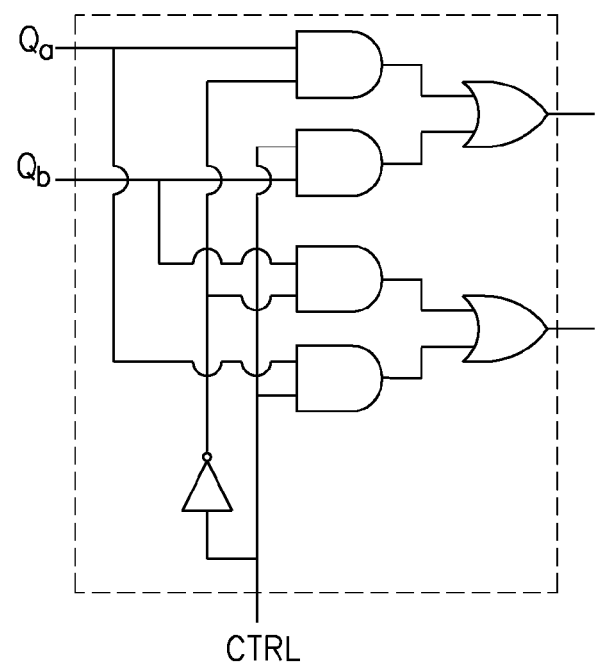
Figure 7D:
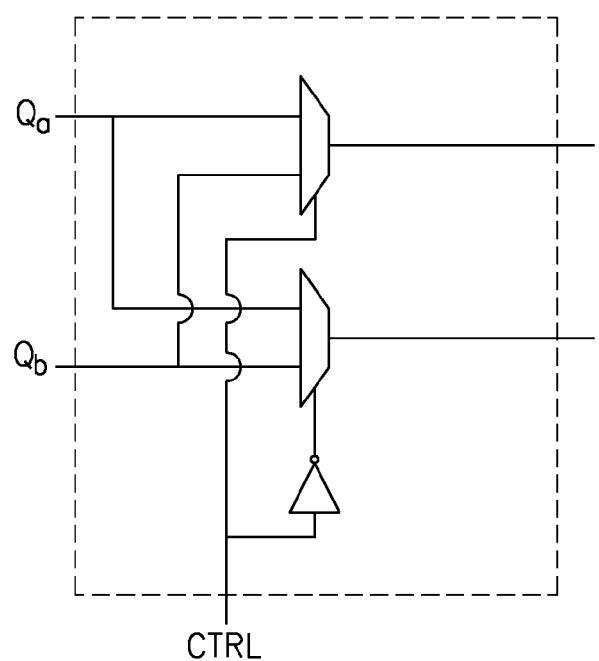

FIG. 7A depicts a schematic diagram of a crossover module that may be used in accordance with embodiments of the invention. Inputs Qa and Qb may be directed to first and second outputs in normal or crossed order depending on the state of the switch, which may be controlled by a single control signal. FIG. 7B depicts an alternate arrangement of the crossover module using inverters that may be used when selectively crossing substantially complementary signals. When the switch is in a first state, the inputs Qa and Qb are output in non-inverted state, whereas when the switch is in a second position, the inputs Qa and Qb may be inverted, thereby effectively providing the crossed outputs. It will be understood that implementation of the crossover module may depend on the placement of the module in the circuit, as well as considerations of design, cost, performance, etc. FIG. 7C depicts a schematic example of a logic gate implementation of a crossover switch that may be used in connection with the present invention. FIG. 7D depicts an example of a multiplexer embodiment of a crossover switch that may be used in connection with the present invention.

It will be noted that embodiments of the invention may use more than one crossover switching arrangements, depending on the converter configuration. In an embodiment of the invention depicted in FIG. 8A, a crossover switching arrangement 800 according to embodiments of the present invention may include two crossover modules in conjunction with a buck-boost arrangement, for example, having an H-topology. The PWM controller of the present invention may be integrated or used in conjunction with a buck-boost controller, for example, Linear Technology's LTC 3780 High Efficiency, Synchronous, 4-Switch Buck-Boost Controller, the specification of which is incorporated herein by reference. It will be noted that the invention is not limited with regard to converter topology; buck-boost, buck, boost, Cuk, sepic, flyback, or any of an assortment of other converters may be used. Buck-boost is used here only by way of example.

Figure 8A:
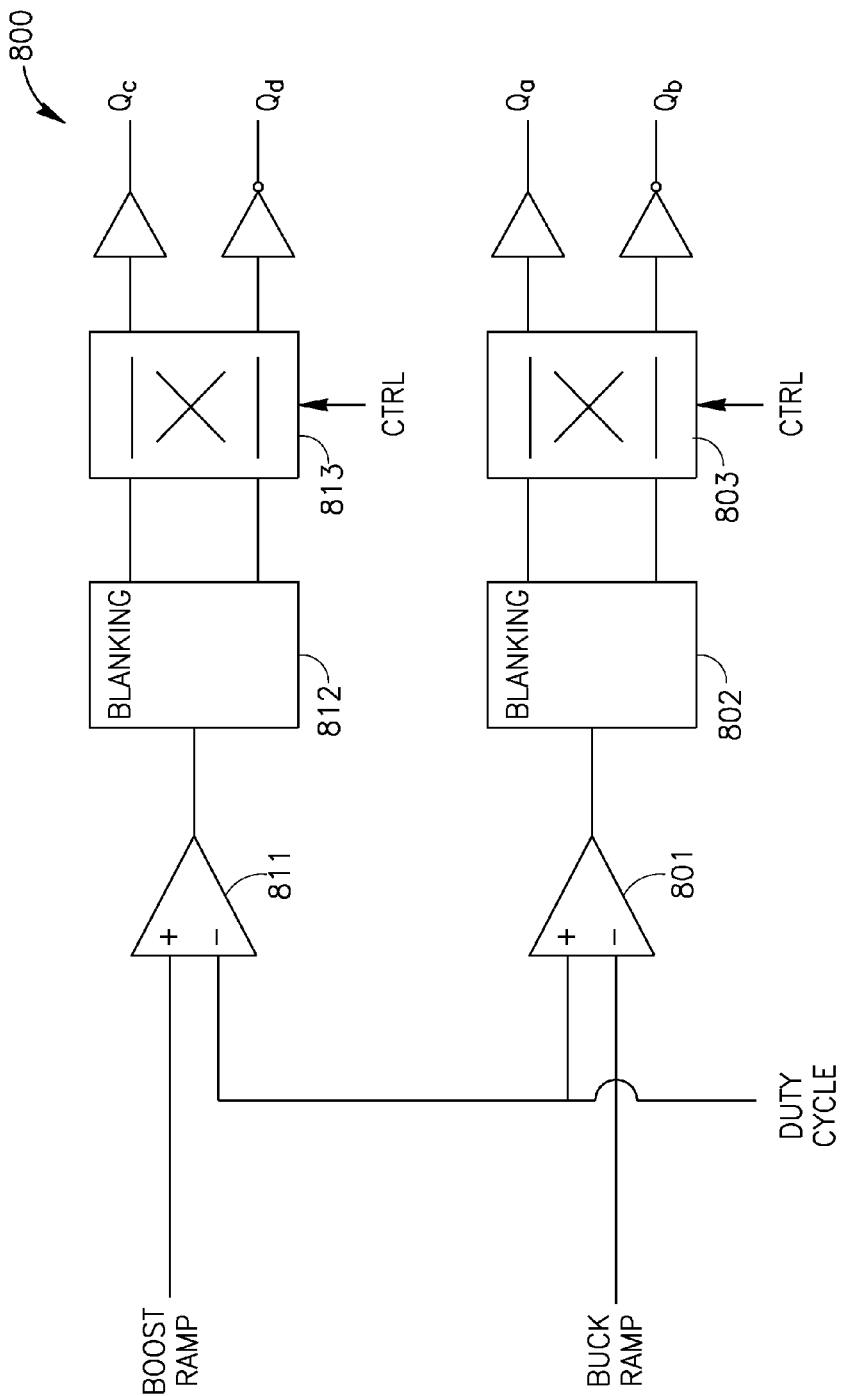
FIGS. 8A and 8B are examples of an AC/AC converter control apparatuses in accordance with embodiments of the present invention utilizing a buck-boost topology.

In the embodiment depicted in FIG. 8A, a buck ramp generator (not shown) may provide a buck ramp signal to an input of buck comparator 801. Another input to comparator 801 may be a signal indicating the duty cycle required, for example, an input reference signal based on the input voltage signal. The result of buck comparator 801 may provide a signal having a desired duty cycle. A blanking circuit 802 may receive the output of buck comparator 801 and produce two signals based thereon, having substantially complementary duty cycles. These outputs may be fed to crossover switch 803, having a control signal, for example, to change states of the crossover switch 803 based on a zero crossing of the input reference signal, or another suitable signal or combination of signals consistent with the teachings of the invention. The outputs of buck crossover switch 803 may be used to drive the buck converter switches A and B.

With respect to the boost portion of the embodiment depicted in FIG. 8A, a boost ramp generator (not shown) may provide a buck ramp signal to an input of boost comparator 811. Another input to boost comparator 811 may be a signal indicating the duty cycle required, for example, an input reference signal based on the input voltage signal. The result of boost comparator 811 may provide a signal having a desired duty cycle. A blanking circuit 812 may receive the output of boost comparator 811 and produce two signals based thereon, having substantially complementary duty cycles. These outputs may be fed to crossover switch 813, having a control signal, for example, to change states of the crossover switch 813 based on a zero crossing of the input reference signal, or another suitable signal or combination of signals consistent with the teachings of the invention. The outputs of boost crossover switch 813 may be used to drive the buck converter switches C and D. It will be recognized that the crossover switch may be placed at other locations between the comparators and the switches, for example, before the blanking circuit, after the switch control signals, or combined with any other component in the circuit.

Figure 8B:
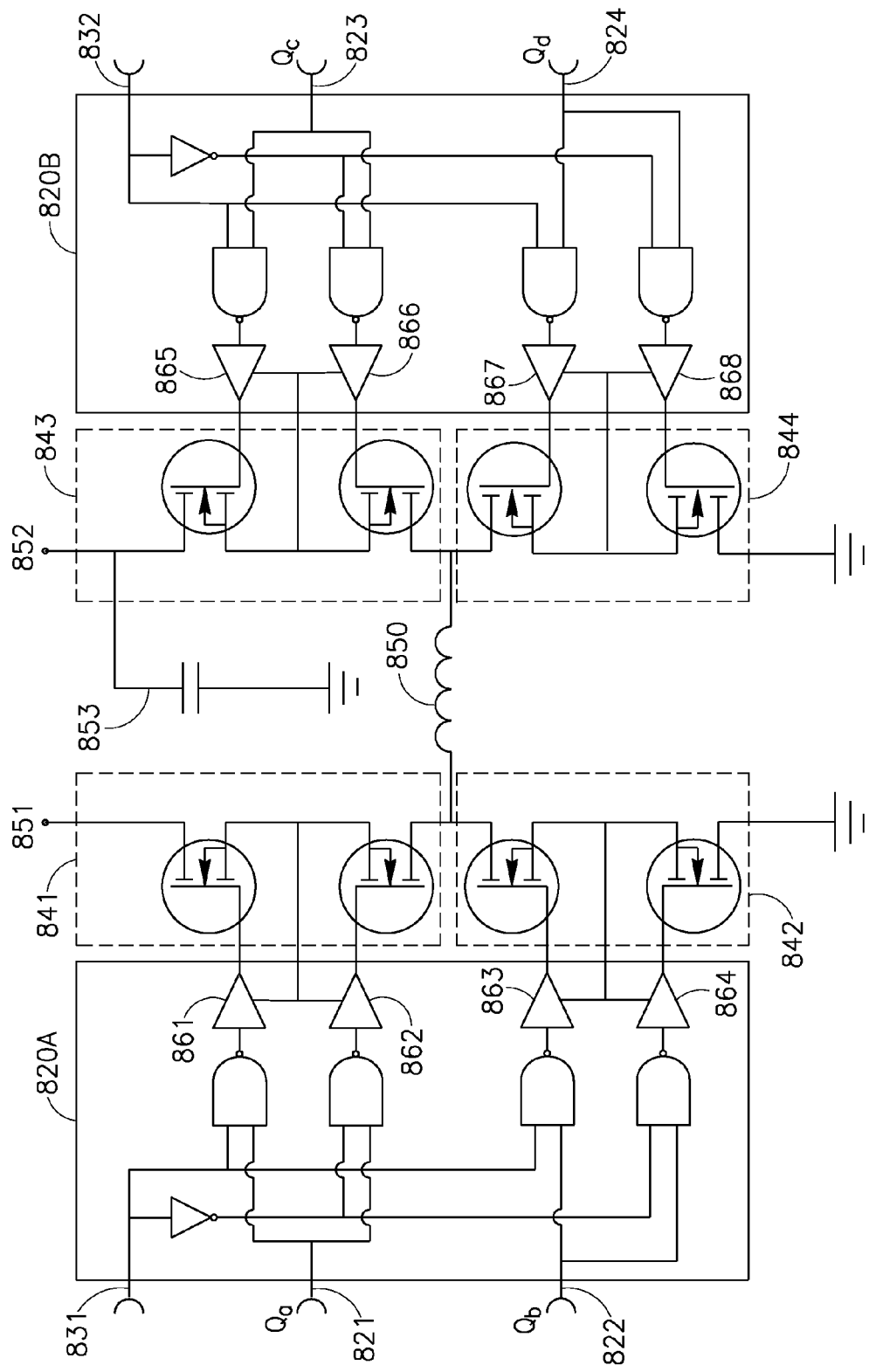

FIG. 8B depicts an embodiment of the invention in which the crossover module 820A, 820B is implemented using logic gates and placed between the pulse width modulation controller and the switches. Input nodes 821, 822, 823 and 824 may receive signals Qa, Qb, Qc and Qd, respectively, from a four-switch buck-boost controller. Control signal input nodes 831 and 832 may receive a control reference signal, as described above. The inverters and AND logic gates of crossover module 820A, 820B may provide logic signals to drivers 861, 862 for signal Qa, to drivers 863, 864 for signal Qb, to drivers 865, 866 for signal Qc, and to drivers 867, 868 for signal Qd. Drivers may provide driving signals to put bidirectional switches 841, 842, 843 and 844 into conducting/non-conducting modes as required by the PWM controller signals and the crossover module, so as to connect the input signal received at node 851 through inductor 850 to the output node 852 across output capacitor 853 to obtain the output signal. In the embodiment of the invention depicted, the driver pairs may have each an output node in common, for example a low node of one driver connected to a high node of a paired driver so as to act as level shifters. It will be recognized that any of the other bidirectional switches, suitably modified, may be used in accordance with embodiments of the invention.

In some of the above embodiments, the crossover switching module was described as being implemented as a digital component, receiving and outputting digital signals. However, embodiments of the present invention may place the crossover switching module at any suitable location in the circuit, for example, in the analog portions thereof.

Figure 9:
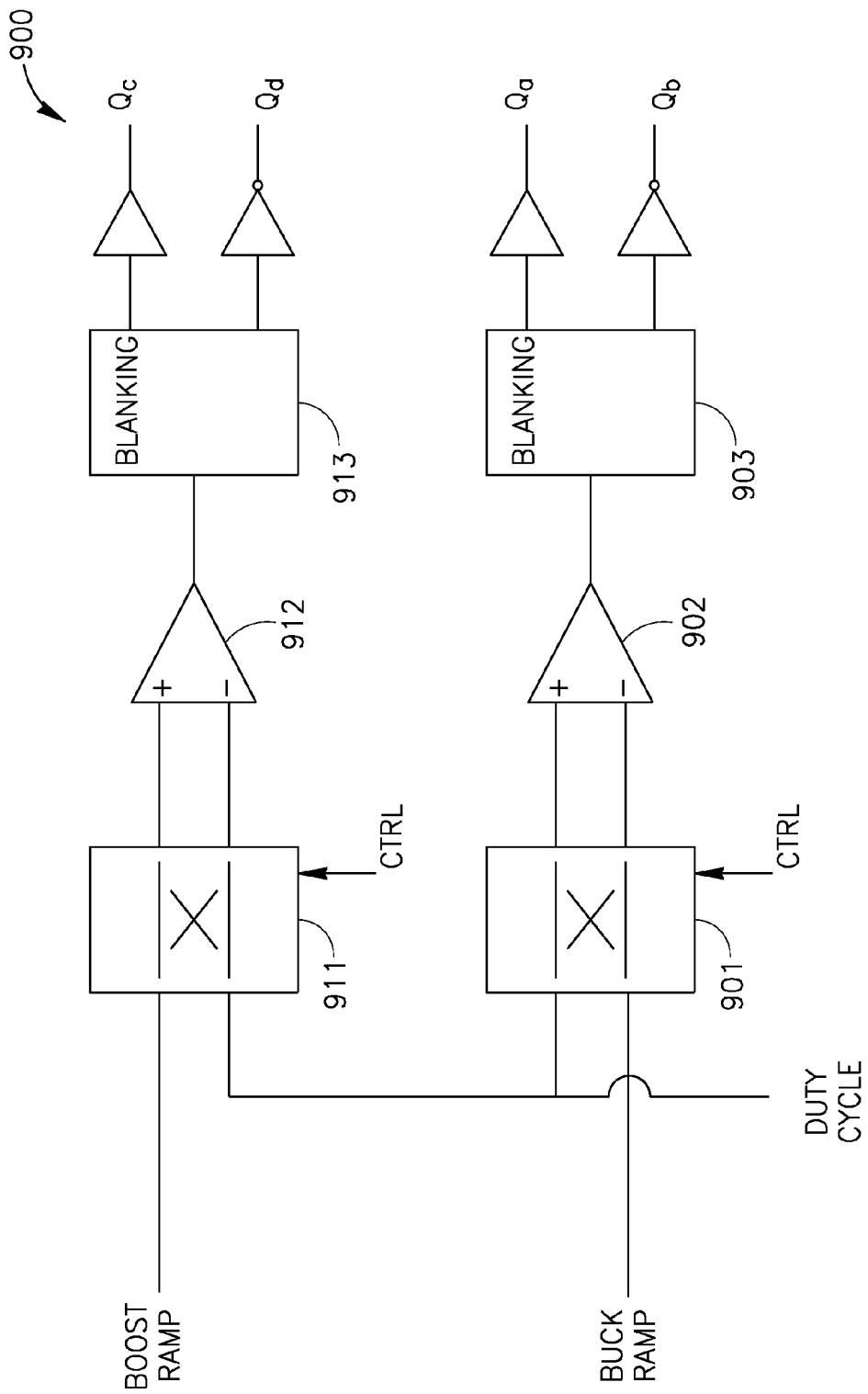
FIG. 9 is a schematic illustration of a crossover module arranged at the input to a pulse width modulation controller in accordance with an embodiment of the present invention.

FIG. 9 depicts an embodiment of the invention 900, in which the crossover switches are placed before the boost and buck comparators. Thus, for example, buck crossover switch 901 receives the duty cycle signal, for example, an input reference voltage signal and buck ramp signal. The crossover control may be as described herein. The buck crossover switch may therefore swap the inputs to buck comparator 902 at the desired time, thereby inverting the duty cycle of the output of buck comparator 902. After blanking circuit 903, the outputs may be used for operating buck switches A and B. With respect to the boost portion of the arrangement, boost crossover switch 911 receives the duty cycle signal, for example, an input reference voltage signal and boost ramp signal. The crossover control may be as described herein. The boost crossover switch may therefore swap the inputs to boost comparator 912 at the desired time, thereby inverting the duty cycle of the output of boost comparator 912. After blanking circuit 913, the outputs may be used for operating boost switches C and D.

In some embodiments of the invention, control of buck crossover switch and boost crossover switch may be based on the same condition, however, this is not required, and they may be based on different signals as suitable. Moreover, it will be recognized that in the buck-boost embodiments, for example, as depicted in FIG. 8 or 9, the crossover switches may be disabled at certain times. For example, when the buck-boost converter is operating in buck mode, the boost converter switches C and D are unchanging, for example, switch C may be non-conducting and switch D may be conducting. Therefore, boost crossover switch should not cross the switching signals to switches C and D during buck operation. Various ways to implement this feature may be employed. For example, each crossover switch may have an enabling control that enables it only when the converter is in a mode that requires its operation. In another embodiment, control signal may be held at a normal state and not crossed unless required.

In some embodiments using bidirectional switches, the bidirectional drive logic may direct the drive signal to an appropriate FET according to the polarity of the input and/or output voltage in accordance with embodiments of the invention, while the other FET may maintain low resistance to reduce the dissipation of the reverse diode and provide the level shifting needed to drive the transistors.

Figure 10:
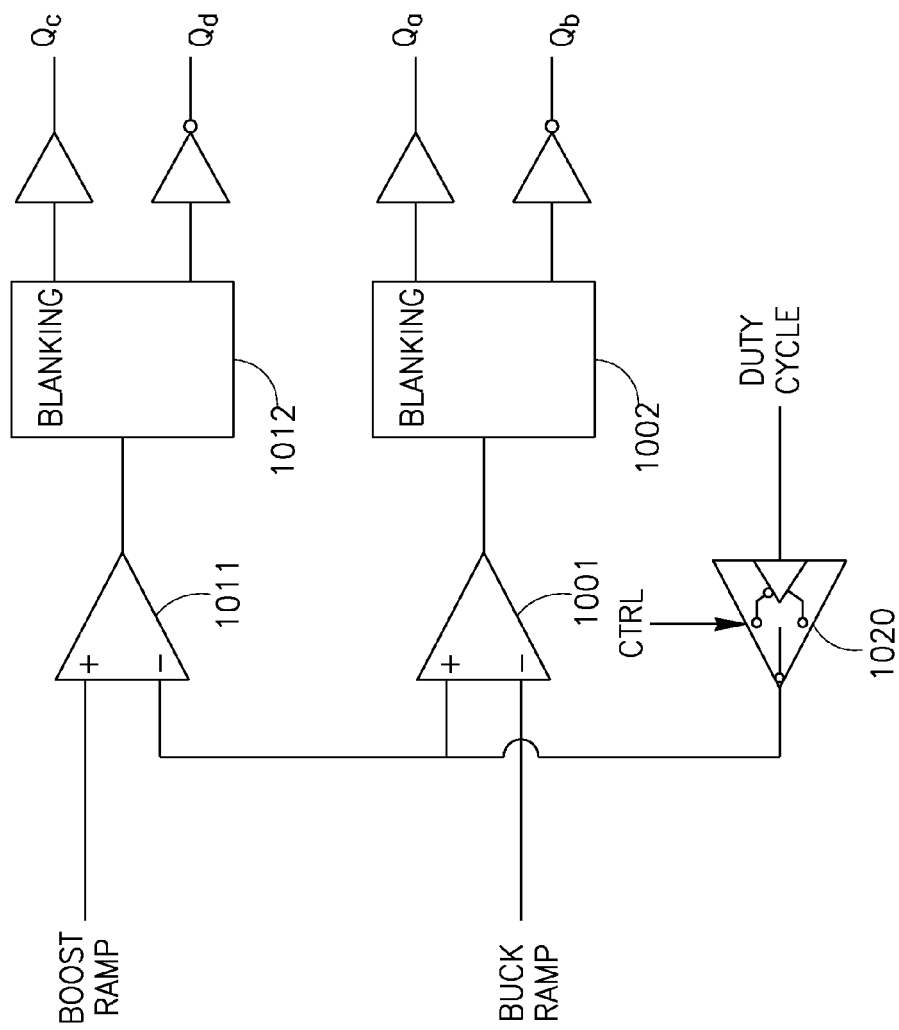
FIG. 10 is a schematic illustration of a crossover module arranged at the input to a pulse width modulation controller in accordance with an embodiment of the present invention.

FIG. 10 depicts an embodiment of the present invention using a selective or controlled inverting/non-inverting amplifier to implement concepts of the present invention. The duty cycle signal may be received at a selectively inverting/non-inverting amplifier 1020, where the selection of inversion/non-inversion may be made by the control signal, as previously described, prior to being received at comparators 1001 and 1011. The amplifier may work as a non-inverting amplifier or as an inverting amplifier when a proper control is activated. When such control is activated, an effect similar to that previously described for reducing effects of singularities or polarity changes.

Figure 11:
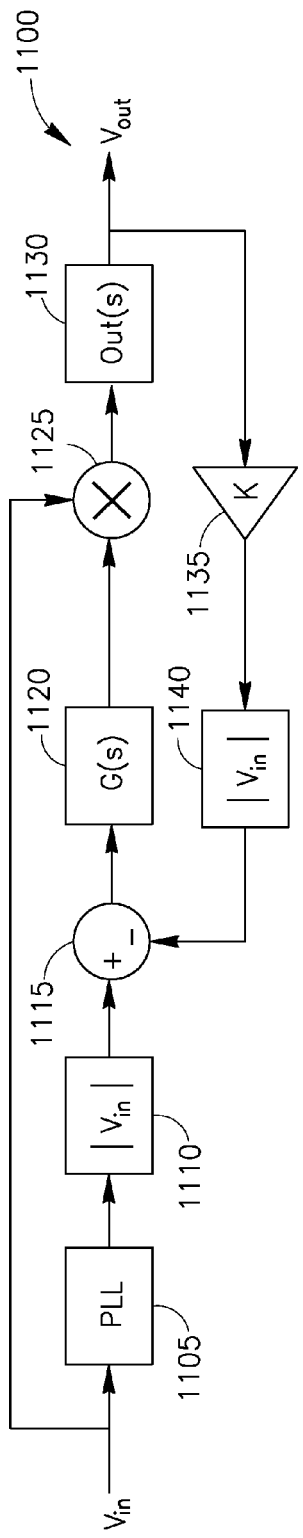
FIG. 11 is a schematic drawing of a PWM control loop in accordance with embodiments of the present invention.

Alternatively or additionally, some embodiments of the invention may establish and/or maintain stability in the PMW using various control methods. FIG. 11 depicts a control system diagram 1100 of a direct AC/AC converter in accordance with embodiments of the invention. Input signal Vin may be passed through a phase-locked loop PLL 1105, for example, in order to provide a reference, and the absolute value of Vin may be taken at block 1110. This absolute value of Vin may be compared at block 1115 with the absolute value of a signal derived at block 1140 from the output signal Vout, for example, in order to serve as sense voltage, for example, by multiplying by a constant K at block 1135. The result of this comparison may be used as an error signal to determine modification of the output signal to track the input signal. The PWM and error amplifier behavior is represented as G(s) at block 1120. The power stage gain is represented as multiplier at block 1125. The output filter may be represented at block 1130 as Out(s).

It will be recognized that to maintain stability in the loop, G(s) may be calculated for optimal stabilization taking into account the power stage gain, wherein the power stage gain is proportional to Vin. Thus, in the case of direct AC/AC conversion, for example, where Vin is a sinusoidal wave changing polarity over each half cycle, the error voltage operated on by G(s) may reduce to zero when output voltage approaches zero, and thus the loop correction may not work at small or substantially zero values of Vin. That is, the control loop may include a product that varies with Vin, which may be problematic for applications in which constant loop gain is desired.

Accordingly, some embodiments of the invention may use a dynamic gain compensation to maintain a constant loop gain over substantially the entire cycle of the AC voltage by canceling the effect of the input voltage signal. In some embodiments, the error signal may be amplified in an amount substantially proportional to the gain reduction of the output stage, thereby rendering the loop gain substantially constant, including during substantially zero input voltage signal. An absolute value block may be included to overcome the changes in polarity of the input and output voltages.

Figure 12A:
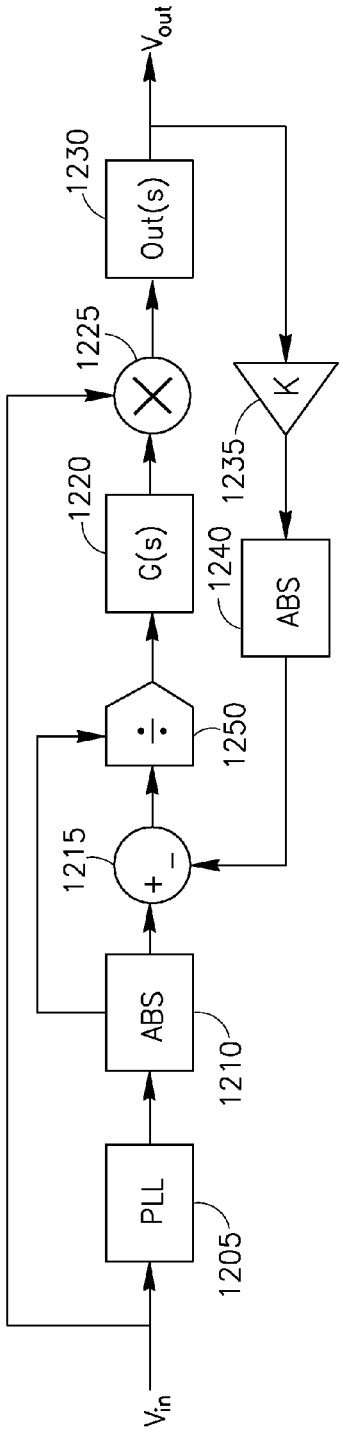
FIGS. 12A and 12B are schematic drawings of PWM control loops in accordance with embodiments of the present invention.

FIG. 12A illustrates a circuit with dynamic gain compensation in accordance with embodiments of the present invention. In the embodiment of the invention depicted in FIG. 12A, the effect of the power stage gain, e.g., multiplication by Vin at block 1225 may be reduced or substantially eliminated by dividing by Vin at divider of block 1250. Thus, the error voltage may be divided by the input voltage to maintain constant gain such that A=Vin, where A is the power gain of the output stage at block 1225. Vref may be a reference voltage attenuated with a factor of K at block 1235 with respect to input voltage, where Vref=K×Vin. Thus the loop gain will be:

$$\frac{(Verr)}{Vref} \times G(s) \times A \times \text{Out}(s) = \frac{Verr}{K \times Vin} \times G(s) \times Vin \times \text{Out}(s) \quad (2)$$

Figure 12B:
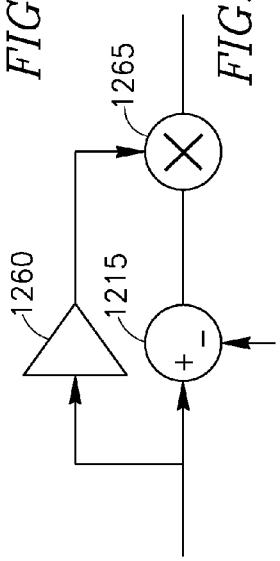

Thus, based on the above equation, the term (Verr/K)×G(s)×Out(s) is independent of Vin and thus, substantially constant gain may be maintained over the full cycle without reference to variations in Vin fluctuations. It will be recognized that various implementations may be used to effect the above mathematical result of eliminating Vin from the control loop gain, for example, by multiplying at block 1265 by the inverse of Vin produced by an inverter 1260, as shown in FIG. 12B.

Figure 13:
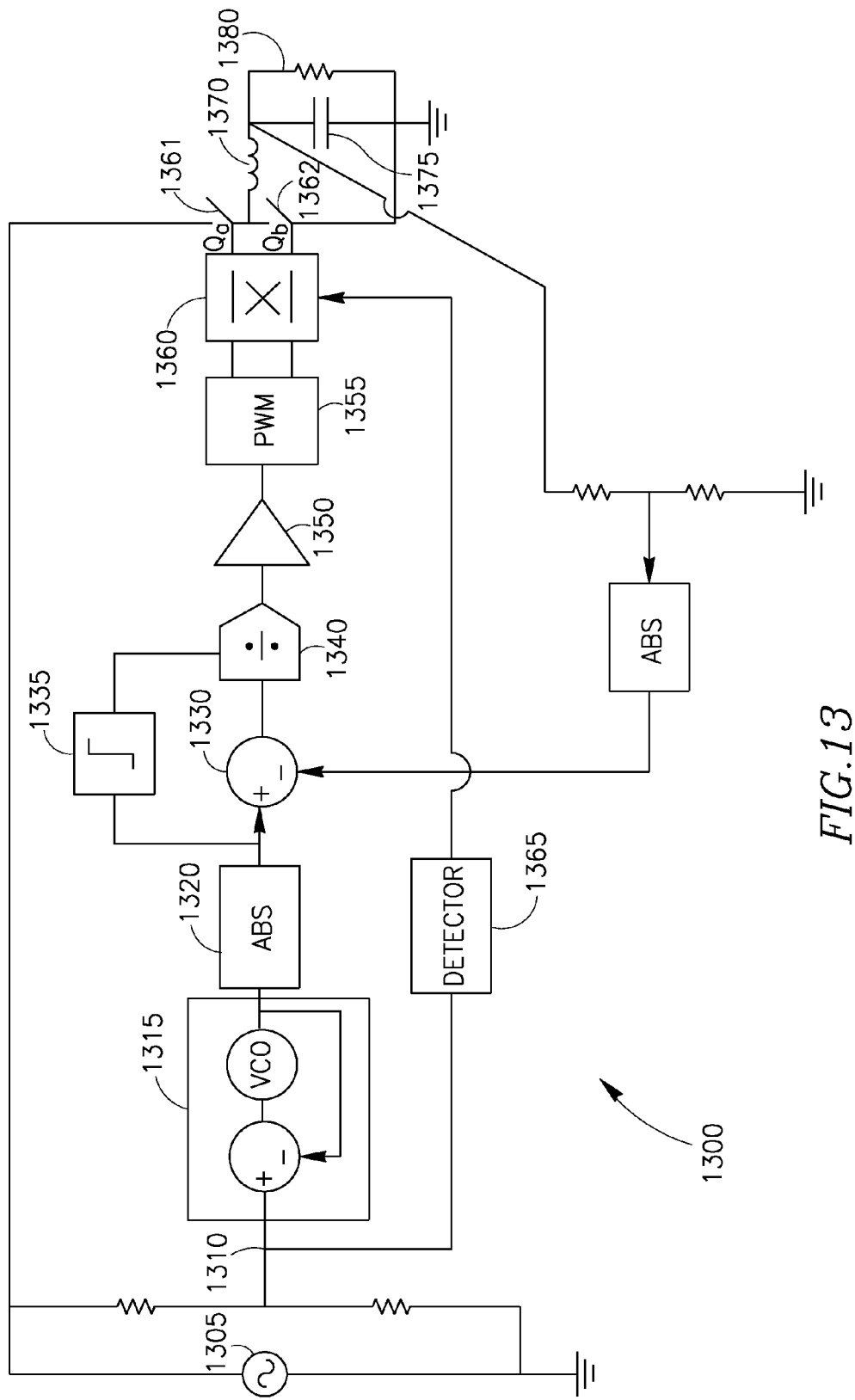
FIG. 13 is a schematic diagram of an AC/AC converter in accordance with embodiments of the present invention.

FIG. 13 is a schematic illustration of one embodiment of an AC/AC converter 1300 including several features of the present invention. The depicted embodiment uses a synchronous buck converter, however, it will be recognized that embodiments of the invention may be applied to any suitable type of power converter.

Input voltage 1305 may be used to derive a reference input voltage at node 1310. A phase locked loop 1315, for example, using a voltage controlled oscillator may be used. It will be recognized that a VCO is one implementation for providing a reference voltage, but other ways are possible, for example, using an input voltage filter. An absolute value of the reference signal may be obtained at block 1320. An error signal may be derived from a subtraction at block 1330 of a signal obtained from the output signal, suitably scaled, for example, by a voltage divider. This error signal may be divided by the input voltage signal, for example, by divider 1340. In some embodiments of the invention, prior to dividing, the input voltage may be limited at block 1335 to avoid dividing by zero, resulting in clipping or saturation. A Type II or Type III compensation-amplifier 1350 may be used to amplify the signal, and provide it to PWM controller 1355. Crossover switch 1360, which may receive a control signal from a detector 1365, may swap the outputs of PWM 1355 and provide the signals Qa and Qb for switches 1361 and 1362. The output filter may include inductor 1370 and capacitor 1375, and the load 1380 may receive the stable output voltage.

As noted above, modifications of the circuit may be used with any converter, for example, boost, buck-boost, Cuk, Sepic, flyback, or others, depending on the application requirements. For a voltage stabilizer where the input voltage is approximately the same as output voltage, a suitable topology may be the "One Inductor" topology, for example, using LTC3780 controller manufactured by Linear Technology.

While certain features of the invention have been illustrated and described herein, many modifications, substitutions, changes, and equivalents will now occur to those of ordinary skill in the art. For example, the present invention may be understood to include devices, systems, and methods for directly controlling AC/AC conversion, e.g., without converting to direct current.

In one application using embodiments of the invention, a direct AC/AC converter may be implemented having a variable conversion ratio, for example, for use as a transformer with constant or variable ratio. In embodiments of the invention used for such purpose, the input/output voltage ratio may be changed by selectively varying the amplitude of the control voltage signal for the given input voltage signal. In some embodiments of the invention, the input/output voltage ratio may be selected manually, e.g., using a potentiometer or voltage divider using elements whose impedance may be varied, which may be placed for example between 1315 and 1320 of FIG. 13. In some embodiments of the invention, the input/output voltage ratio may be altered automatically, for example, using a feedback system to cause the output amplitude to be changed in order to follow a desired reference voltage.

Figure 14A:
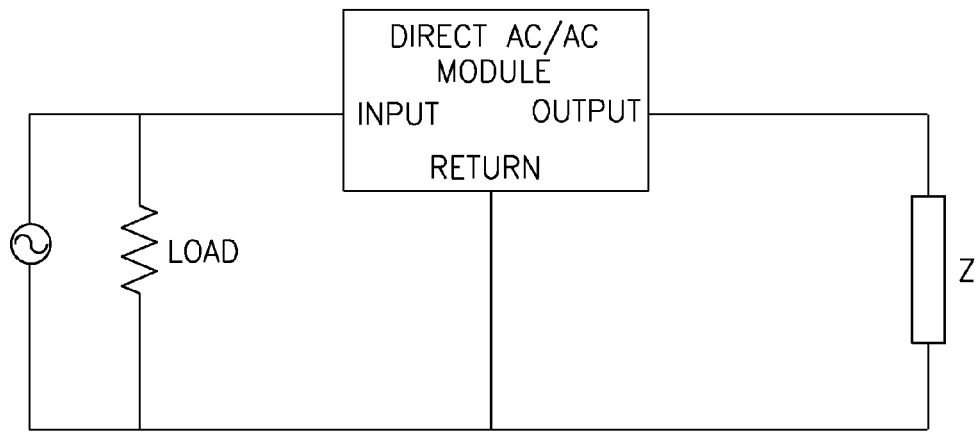
FIGS. 14A, 14B and 14C are schematic block diagrams of applications utilizing embodiments of the present invention that may be used for power factor correction.
Figure 14B:
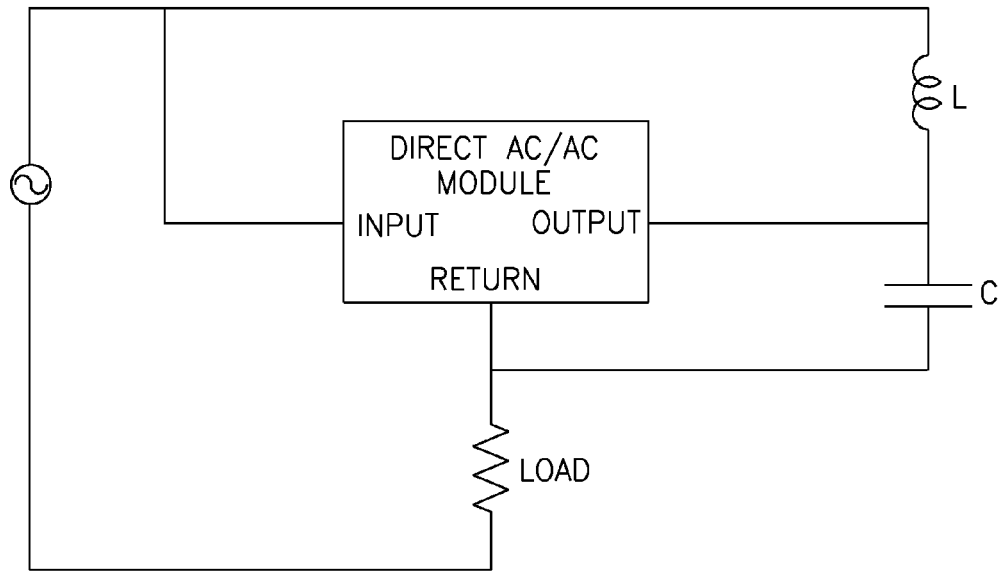
Figure 14C:
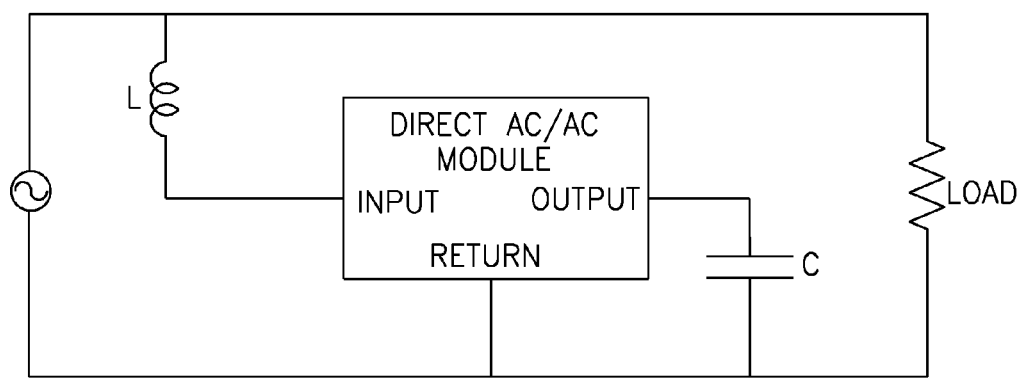

Embodiments of the invention may be used for power factor correction. FIG. 14A is a schematic block diagram depicting an application for power factor correction using embodiments of the invention. FIG. 14 depicts deploying an embodiment of the present invention in a three-leg unit, where an input leg to the module is connected to an input voltage supplied to a load, an output leg to the module is connected to an output impedance, and the return leg is common Depending on the application, the output impedance may be chosen to be inductive or capacitive, and its impedance selected. Since the AC/AC module may act as a transformer, e.g., reflecting output impedance to the input, it may be used to adjust the amount of capacitive or inductive impedance reflected to the input, thereby enhancing the power factor. Other configurations using a three-leg module embodiment of the present invention may also be used. For example, the connection diagram of FIG. 14B may be used to enable capacitive and inductive load compensation by placing a direct AC/AC converter module in series with the load. As a further example, the connection diagram of FIG. 14C may be used to enable capacitive and inductive load compensation by placing a direct AC/AC converter module in parallel with the load. It will be understood that other arrangements or connections of a direct AC/AC converter module may be employed consistent with the teachings of the present invention.

Embodiments of the invention may be used in conjunction with a three-phase output for the VCO to control three-phase direct AC/AC converter.

Embodiments of the invention may be used for stabilizing generator outputs. In another application, embodiments of the invention may be used for enabling wide input voltage range AC applications, for example, motors, generators, or others. In yet another application, embodiments of the invention may be used to enable power efficient control of light bulbs.

Embodiments of the invention may be implemented on an integrated chip, for example, by constructing the controller, crossover switch and other circuitry in an application-specific integrated circuit (ASIC) or other integrated circuit.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of converting an input alternating current (AC) signal to an output AC signal using synchronous pulse width modulation comprising:
   receiving the input AC signal;
   producing a reference signal based on the input AC signal;
   producing a first pulse-width modulated signal based on the level of said reference signal;
   inverting the first pulse width modulated signal, thereby producing a second pulse width modulated signal having an inverse duty cycle; and
   driving a first and a second converter switches using the first pulse-width modulated signal and the second pulse width modulated signal according to a first and a second modes, thereby producing said output signal, wherein in the first mode, the first converter switch is driven by the first pulse width modulated signal, and the second converter switch is driven by the second pulse width modulated signal, and in the second mode, the first converter switch is driven by the second pulse width modulated signal, and the second converter switch is driven by the first pulse width modulated signal.

2. The method of claim 1, wherein said reference signal is based on the phase of the input signal and on the level of the output AC signal.

3. The method of claim 1, wherein said first and second modes are timed with reference to a zero crossing of said input signal.

4. The method of claim 1, wherein said first and second modes are timed with reference to a zero crossing of said output signal.

5. The method of claim 1, wherein changing between the first and the second modes comprises swapping connections of two substantially complementary digital signals.

* * * * *